Aug. 3, 1943.  D. C. BATTERSON  2,325,649
CONSTANT BELT POSITION RESILIENTLY EXPANSIBLE PULLEY
Filed Sept. 22, 1941  2 Sheets-Sheet 1
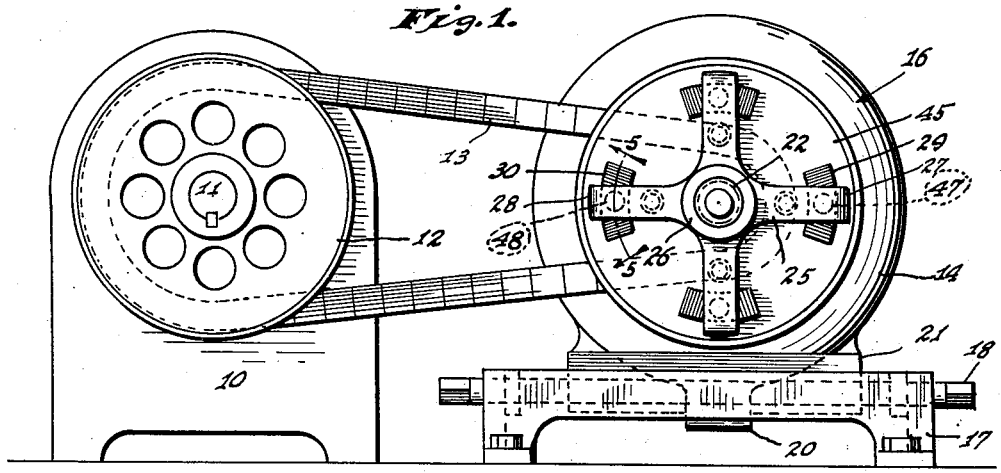
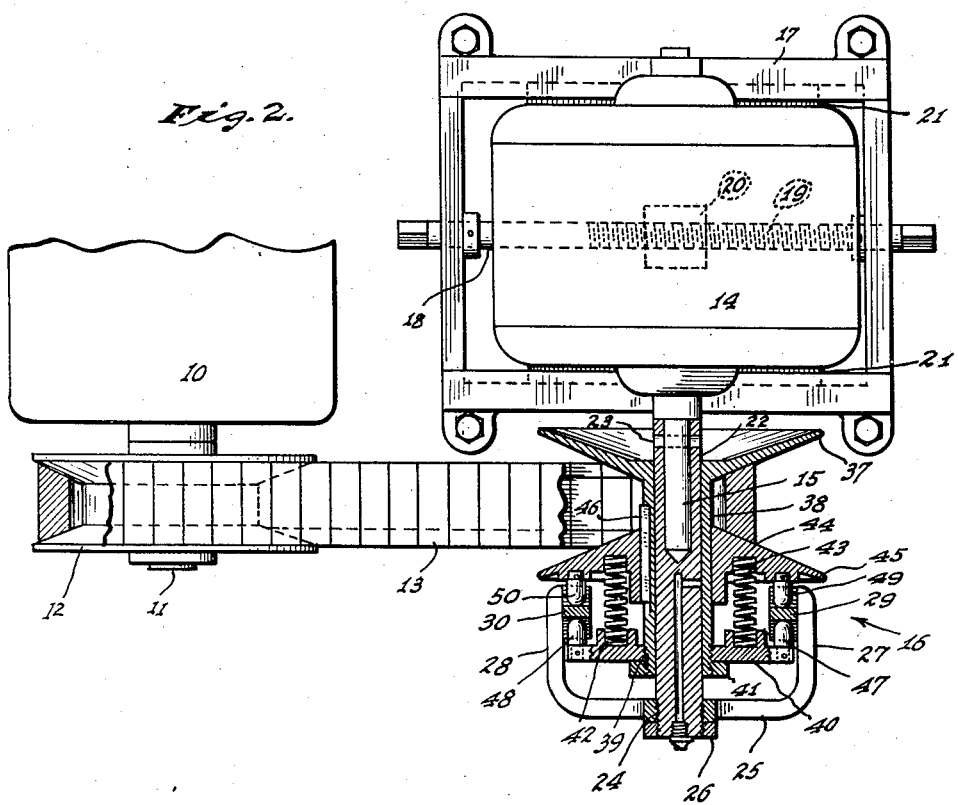
INVENTOR.
DWIGHT C. BATTERSON,
BY Hood + Stahn
ATTORNEYS.

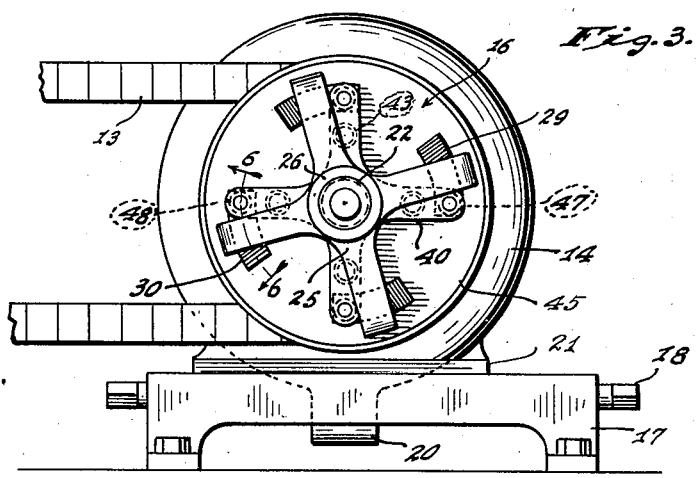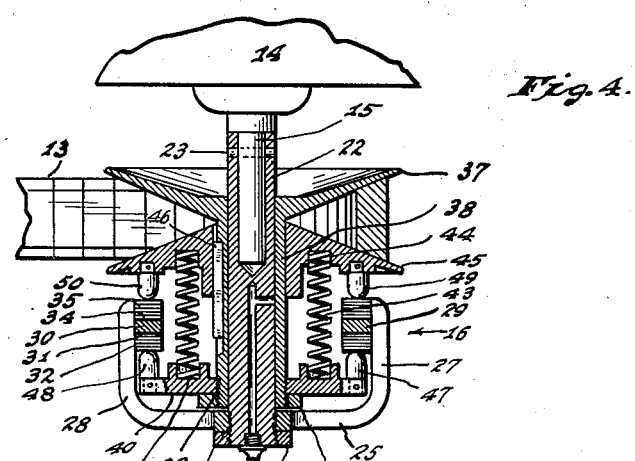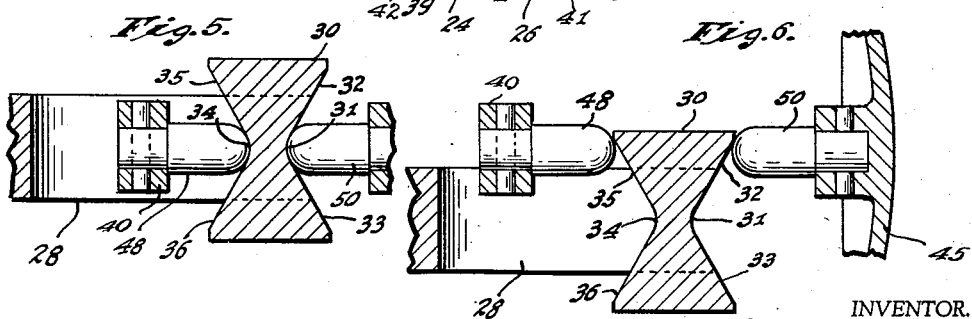

Patented Aug. 3, 1943

2,325,649

UNITED STATES PATENT OFFICE 2,325,649

CONSTANT BELT POSITION RESILIENTLY EXPANSIBLE PULLEY

Dwight C. Batterson, Hinsdale, Ill., assignor to Reeves Pulley Company, Columbus, Ind., a corporation of Indiana Application September 22, 1941, Serial No. 411,820

13 Claims. (Cl. 74—230.17)

The present invention relates to variable speed power transmissions, and more particularly to that type of mechanism in which power is transmitted through an edge-active belt, either from or to a V-pulley comprising relatively axially movable coned discs, there being provided means for varying the center distance between the input and output pulleys, whereby to vary the effective diameter of the expansible V-pulley by positioning the belt more or less deeply in the cleft between the faces of the coned discs.

Mechanism of the general character here under consideration is disclosed in the patent to Paul Reeves No. 1,822,935, and a different form of a mechanism of the same general character is illustrated in the patent to Paul Reeves No. 1,941,417.

In both of these patents, the problem of belt alignment is discussed. When a belt is pulled more deeply into the cleft between the discs 7 and 8, for instance, of the Reeves Patent No. 1,822,935, it is forced to move upwardly, as viewed in Fig. 1 of that patent, as it moves inwardly across the face of the fixed disc 7. For that reason, the Reeves Patent No. 1,822,935 discloses a structure in which the belt drives to a flat faced pulley wide enough to accommodate the bodily movement of the belt resulting from such shifting across the face of the disc 7. In the Reeves Patent No. 1,941,417, compensation for movement of the belt axially with respect to the fixed disc 15 is provided by shifting the motor along a line angularly related to the median plane of the belt.

There are obviously circumstances under which it is desirable for the belt of a transmission of the character here under consideration to drive to or from a V-pulley of fixed effective diameter, and in which it is undesirable or impossible to mount either of the shafts of the transmission to move in any direction except in a direction exactly perpendicular to the axes of the shafts. It is obviously undesirable to cause the belt to be shifted out of alignment; and therefore it is desirable to provide a mechanism in which the two discs making up the expansible pulley shall be equally and oppositely shiftable axially of the shaft upon which they are mounted, in order to maintain the position of the median plane of the belt, regardless of changes in the effective diameter of the pulley. It is the primary object of the present invention to provide such a mechanism.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a transmission of the character here under consideration;

Fig. 2 is a plan view thereof, parts being shown in section for clarity of illustration;

Fig. 3 is a side elevation of the expansible pulley in a different position of adjustment;

Fig. 4 is a substantially horizontal section through the expansible pulley with the parts in the position of Fig. 3;

Fig. 5 is an enlarged sectional view taken substantially on the line 5—5 of Fig. 1; and Fig. 6 is a similar view taken substantially on the line 6—6 of Fig. 3.

Referring more particularly to the drawings, it will be seen that I have illustrated a driven machine 10 having a shaft 11 upon which is secured a fixed diameter V-pulley 12 adapted to be driven, through an edge-active belt 13, by a motor 14, upon the spindle 15 of which is mounted the resiliently expansible pulley of the present invention, indicated generally by the reference numeral 16.

The motor 14 is mounted upon a bed 17 in which is journalled a shaft 18 having a threaded portion 19 threadedly associated with a lug 20 secured to the base 21 of the motor, so that rotation of the shaft 18 in one direction or the other will produce longitudinal movement of the motor 14 in one direction or the other upon the bed 17, whereby the center distance between the shaft 11 and the motor spindle 15 may be varied.

A supporting member or shaft 22 is fixed by a pin 23 or the like to the motor spindle 15; and at its outer end, said supporting element 22 is threaded as at 24 for the reception of a bar or spider 25 and a lock nut 26 for securing the element 25 in position on the supporting element 22. The element 25 is provided with two or more arms 27 and 28 disposed substantially parallel with the axis of the element 22, and, in the illustrated embodiment of the invention, located on diametrically opposite sides of said axis. The arm 27 carries a cam 29, and the arm 28 carries a cam 30. As is clearly illustrated in Figs. 5 and 6, each of said cams is formed to provide two cam surfaces 32 and 33 flaring oppositely peripherally from one side 31 of its peripheral midpoint, and two allochiral cam surfaces 35 and 36 oppositely flaring peripherally from the other side 34 of its peripheral midpoint.

A coned disc 37 is loosely mounted on the supporting member 22, and said disc is formed with an elongated hub 38 projecting from its coned surface, said hub being threaded at 39 adjacent its outer end for the reception of a bar or spider 40 and a lock nut 41. The element 40 is provided on its inner surface with a plurality of cups 42, each supporting one end of one of a series of coiled springs 43. The opposite end of each of said springs is received in a cup 44 formed in the outer face of a second coned disc 45 slidably mounted upon the hub 38 in facing relation to the disc 37. A key 46 is provided to hold the disc 45 against rotational movement relative to the disc 37.

The element 40 is provided with two or more abutment members 47 and 48, for cooperation with the outer surfaces 34, 35, 36 of the cams 29 and 30; and similar abutment members 49 and 50 are directly carried by the disc 45 for cooperation with the inner surfaces 31, 32, 33 of said cam members. I have found wood to be a very satisfactory material for the abutment members 47, 48, 49, and 50.

It will be noted that the springs 43, bearing upon the disc 45 and the bar 40, tend to urge the discs 37 and 45 toward each other; but these springs are relatively light, providing only sufficient force to prevent the discs from moving out of contact with the belt 13. When the motor 14 is energized to drive the spindle 15 thereof in a counterclockwise direction as seen in Fig. 1, the supporting element 22, pinned to the motor spindle 15, will tend to run away from the discs 37 and 45 which are not secured to said supporting element. That tends to move the element 25 in a counterclockwise direction with respect to the disc 45 and its abutment members 49 and 50 and with respect to the bar 40 and its abutment members 47 and 48. Such a tendency tends to force the surfaces 32 and 35 between the abutment members 50 and 48, which tends to squeeze the discs 37 and 45 upon the engaged surfaces of the belt 13.

Because the belt 13 is transversely stiff, and assuming that the belt is already taut, such movement of the discs toward each other is prevented; and, because the cams cannot move peripherally with relation to the abutment elements 47, 48, 49, and 50 without separating those abutment elements, it follows that the abutment elements will be dragged along with the cam elements. Thus, the cam elements and the abutment elements form a driving connection between the motor spindle and the discs 37 and 45.

If, now, the shaft 18 is rotated to move the motor 14 toward the machine 10, some slack will be created in the belt 13; whereby the discs 37 and 45 will be freed to move toward each other to take up the belt slack. Since the cams 29 and 30 are always trying to run ahead of the abutment members 47, 48, 49, and 50, those abutment members will immediately lag behind the cam elements, thereby riding up the surfaces 32 and 35 of the cam elements to maintain the driving engagement of the discs 37 and 45 with the belt 13. Because the key 46 positively prevents any relative rotational movement between the discs 37 and 45, the abutments 47 and 48 and the abutments 49 and 50 will move equally across the allochiral cam surfaces 32 and 35, whereby the discs 37 and 45 will be caused to move equally and oppositely in the direction of the axis of the motor spindle 15, so that the position of the median plane between the discs 37 and 45 will not be changed.

Similarly, if the shaft 18 is rotated in the opposite direction, the belt 13 will be pulled inwardly between the discs 37 and 45 to force the same to move apart; and that movement of the discs will be guided by the engagement of the abutment members with the surfaces 32 and 35 of the cams 29 and 30, whereby the discs 37 and 45 will move axially equally and oppositely. Of course the separating movement of the discs 37 and 45 is accompanied by a slight movement of said discs rotationally with respect to the supporting element 22.

It will be apparent from the above description of operation that, if the pulley 16 were always to be used upon a motor spindle driving in a counterclockwise direction, the cam surfaces 33 and 36 would be superfluous. The organization, however, will preferably include cams having surfaces 33 and 36 as well as the surfaces 32 and 35, in order that it may be used alternatively on a motor shaft driving in a clockwise direction; or, as a still further alternative, upon a driven shaft operating in either direction. If the pulley 16 is mounted upon a driven shaft to be driven in a counterclockwise direction, application of driving force to the discs 37 and 45 will tend to cause the abutment members 47, 48, 49, and 50 to run up upon the surfaces 33 and 36. If, however, the belt is already taut, it will obviously be impossible for the abutment members so to move over the cam surfaces, and the cams will be dragged along with the abutment members to drive the shaft upon which the cams are secured. Decrease in the center distance between the driving and driven shafts, however, will provide slack in the belt which will permit the discs 37 and 45 to run slightly ahead of the driven shaft, whereby the abutment members will be caused to ride forward upon the surfaces 33 and 36 to contract the pulley, thereby forcing the belt outwardly to a greater effective diameter.

It will be apparent that the structure of the present invention is such as to result in variations in the degree of pressure exerted by the expansible pulley upon the sides of the belt, more or less proportional to the load or torque being transmitted through the belt. That is, an increase in the torque demand of the machine 10 of Fig. 1 will place an increasing drag upon the pulley 16, thereby tending to cause the pulley 16 to lag behind the spindle 15. Thereby, the force exerted by the cams 29 and 30 against the abutment elements 47, 48, 49 and 50 will be increased, thus increasing the component of the force so exerted tending to force the discs 37 and 45 toward each other.

Similarly, if the expansible pulley is mounted upon the driven shaft, an increase in the torque demand on the driven shaft will tend to cause the driven shaft to lag behind the pulley, and thereby similarly increasing the force exerted by the abutment elements upon the cam elements, thus increasing the component of such force tending to move the pulley discs toward each other.

I claim as my invention:

1. An expansible V-pulley comprising a rotatable supporting element, a coned disc loosely mounted on said element, a mating coned disc mounted in facing relation to said first-named disc and movable axially and rotationally with respect to said element, said discs being fixed against relatively rotational movement, and means associated with said supporting element and positioned between elements respectively operatively associated with said respective discs for translating rotational movements of said discs with respect to said supporting element into equal and opposite axial movements of said discs with respect to said supporting element, whereby the position of the median plane between said discs is maintained substantially constant during expansion and contraction of said pulley.

2. An expansible V-pulley comprising a rotatable supporting element, a pair of mating coned discs supported on said element and axially and rotatably movable with respect thereto, means preventing relative rotational movement between said discs, and means associated with said supporting element and cooperating with means being located on one side only of said pulley, respectively operatively associated with said respective discs for enforcing equal and opposite movement of one of said discs with respect to said supporting element upon axial movement of the other of said discs with respect to said supporting element, whereby the position of the median plane between said discs is maintained substantially constant during expansion and contraction of said pulley.

3. An expansible V-pulley comprising a rotatable supporting element, a pair of mating coned discs supported on said element and axially and rotatably movable with respect thereto, means preventing relative rotational movement between said discs, and cam means providing a driving connection between said supporting element and said discs, said cam means being located on one side only of said pulley, cooperating with means respectively operatively associated with said respective discs, and impressing thereon equal and opposite forces tending to shift said discs axially with respect to said supporting element.

4. An expansible V-pulley comprising a rotatable supporting element, a coned disc loosely mounted on said element, a mating coned disc mounted in facing relation to said first-named disc and axially shiftable with respect thereto and to said supporting element but held against rotational movement with respect to said first-named disc, means on said first-named disc projecting through said second-named disc and beyond the outer face of said second-named disc, said supporting member projecting beyond the projecting portion of said last-named means, two cam elements carried by the projecting portion of said supporting element in diametrically opposed relation, a pair of abutment members carried by the projecting portion of said last-named means in cooperative relation with said respective cam elements, and two abutment members operatively associated with said second-named disc in opposite cooperative relation with said respective cam elements.

5. An expansible V-pulley comprising an axially-fixed rotatable supporting element, a pair of mating discs supported on said element and axially and rotatably movable with respect thereto, the adjacent faces of said discs being coned, means preventing relative rotary movement between said discs, a cam element axially and rotatably fixed relative to said supporting element adjacent the outer face of one of said discs, said cam element having opposite allochiral surfaces, and abutment members respectively operatively associated with said discs and respectively engaging said allochiral cam surfaces, said cam element cooperating with said abutment members to provide a driving connection between said supporting element and said discs.

6. An expansible V-pulley comprising an axially-fixed rotatable supporting element, a pair of mating coned discs supported on said element and axially and rotatably movable with respect thereto, means preventing relative rotary movement between said discs, a cam element axially and rotatably fixed relative to said supporting element at one side only of said pulley, said cam element having opposite allochiral surfaces, and abutment members respectively operatively associated with said discs and respectively engaging said allochiral cam surfaces.

7. In an expansible V-pulley comprising a pair of coned discs relatively axially movable but held against relative rotation, spring means urging the coned faces of said discs toward each other, and cam means positioned adjacent one only of said discs but cooperating with both of said discs and exerting thereagainst a force tending to rotate the same on their common axis and a force tending to move said discs toward each other.

8. In an expansible V-pulley comprising two coned discs, each axially movable, and means preventing relative rotation of said discs about their common axis, spring means urging the coned faces of said discs toward each other, and cam means positioned adjacent one only of said discs, rotatable about said common axis, but held against axial movement, and cooperating with said two discs to exert thereagainst a force tending to rotate said discs about said axis and a force tending to move said discs toward each other.

9. In an expansible V-pulley comprising a pair of coned discs relatively axially movable but held against relative rotation, and cam means cooperating with both of said discs and exerting thereagainst a force tending to rotate the same on their common axis and a force tending to move said discs toward each other, said cam means being located adjacent one axial end only of said pulley.

10. An expansible V-pulley comprising a rotatable supporting element, a coned disc loosely mounted on said element and having an elongated hub projecting from its coned face, a mating coned disc splined on said hub for axial reciprocation with respect thereto, said hub projecting beyond the outer face of said second-named disc and said supporting element projecting beyond said hub, cam means carried by the projecting portion of said supporting element, an abutment member carried by the projecting portion of said hub in cooperative relation with said cam means, and an abutment member operatively associated with said second-named disc in opposite cooperative relation with said cam means.

11. An expansible V-pulley comprising a rotatable supporting element, a coned disc loosely mounted on said element and having an elongated hub projecting from its coned face, a mating coned disc splined on said hub for axial reciprocation with respect thereto, said hub projecting beyond the outer face of said second-named disc and said supporting element projecting beyond said hub, two cam elements carried by the projecting portion of said supporting element in diametrically opposed relation, a pair of abutment members carried by the projecting portion of said hub in cooperative relation with said respective cam elements, and two abutment members operatively associated with said second-named disc in opposite cooperative relation with said respective cam elements.

12. An expansible V-pulley comprising a rotatable supporting element, a bar fixed to said element adjacent one end thereof and having two arms substantially parallel with the axis of said element and substantially diametrically oppositely positioned, each of said arms carrying a cam shaped to provide two surfaces flaring oppositely in a peripheral direction, a coned disc loosely mounted on said supporting element adjacent the opposite end thereof and provided with means engaging that flaring surface of each of said cams nearest the first-named end of said supporting element, and a mating coned disc axially movable with respect to said first-named disc but held against rotation with respect thereto, said second-named disc being positioned between said cams and said first-named disc and being provided with means engaging the other flaring surface of each of said cams.

13. An expansible V-pulley comprising a rotatable supporting element, a bar fixed to said element adjacent one end thereof and having two arms substantially parallel with the axis of said element and substantially diametrically oppositey positioned, each of said arms carrying a cam shaped to provide two surfaces flaring oppositely in a peripheral direction, a coned disc loosely mounted on said supporting element adjacent the opposite end thereof and provided with means engaging that flaring surface of each of said cams nearest the first-named end of said supporting element, and a mating coned disc axially movable with respect to said first-named disc but held against rotation with respect thereto, said second-named disc being positioned between said cams and said first-named disc and being provided with means engaging the other flaring surface of each of said cams, and spring means urging said discs toward each other.

DWIGHT C. BATTERSON.

CERTIFICATE OF CORRECTION.

Patent No. 2,325,649.   August 3, 1943.

DWIGHT C. BATTERSON.

It is hereby certified that error appears in the printed specification of the above numbered patent requiring correction as follows: Page 3, first column, line 16-17, claim 2, after "and" strike out "cooperating with means being located on one side only of said pulley," and insert instead --positioned between elements--; page 4, second column, line 6, claim 13, for "oppositey" read --oppositely--; and that the said Letters Patent should be read with this correction therein that the same may conform to the record of the case in the Patent Office.

Signed and sealed this 14th day of September, A. D. 1943.

(Seal)
Henry Van Arsdale,
Acting Commissioner of Patents.